United States Patent
Eickhoff

(10) Patent No.: US 10,693,554 B2
(45) Date of Patent: Jun. 23, 2020

(54) METHOD FOR COMMUNICATION BETWEEN A GROUND TERMINAL ON THE EARTH'S SURFACE AND A SATELLITE

(71) Applicant: Airbus Defence and Space GmbH, Taufkirchen (DE)

(72) Inventor: Jens Eickhoff, Immenstaad (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 42 days.

(21) Appl. No.: 15/892,933

(22) Filed: Feb. 9, 2018

(65) Prior Publication Data

US 2018/0167136 A1    Jun. 14, 2018

Related U.S. Application Data

(63) Continuation of application No. PCT/EP2016/066914, filed on Jul. 15, 2016.

(30) Foreign Application Priority Data

Aug. 10, 2015    (DE) ........................ 10 2015 010 132

(51) Int. Cl.
  *H04B 7/185*    (2006.01)
(52) U.S. Cl.
  CPC ................................ *H04B 7/18586* (2013.01)
(58) Field of Classification Search
  CPC .................................................. H04B 7/18586
  See application file for complete search history.

(56) References Cited

U.S. PATENT DOCUMENTS

| 6,173,332 B1* | 1/2001 | Hickman | ................ H04L 67/42 370/270 |
| 7,415,329 B2* | 8/2008 | Nowak | .................... H04B 7/19 701/13 |

(Continued)

FOREIGN PATENT DOCUMENTS

| EP | 2541855 A2 | 1/2013 |
| EP | 2717493 A1 | 4/2014 |

(Continued)

OTHER PUBLICATIONS

Blumenthal, "Medium Earth Orbit Ka Band Satellite Communications System," 2013 IEEE Military Communication Conference, IEEE, XP032563539, DOI: 10.1109/Milcom.2013.54, pp. 273-277, dated Nov. 18, 2013.

(Continued)

*Primary Examiner* — Asad M Nawaz
*Assistant Examiner* — Thomas R Cairns
(74) *Attorney, Agent, or Firm* — Jenkins, Wilson, Taylor & Hunt, P.A.

(57) ABSTRACT

A method for communication between a ground terminal on the earth's surface and a satellite, wherein the ground terminal and a radio terminal of the satellite are set up for IP-based communication. The communication proceeds such that one or more IP-based protocols are used with the interposition of a space-based Internet system to transmit control commands for one or more modules of the satellite from the ground terminal to the radio terminal, which receives the control commands by radio from the space-based Internet system and forwards them to the module(s). Alternatively or additionally, module data, which come from one or more modules of the satellite, are transmitted from the radio terminal to the ground terminal, with the radio (Continued)

terminal sending the module data by radio to the space-based Internet system.

10 Claims, 1 Drawing Sheet

(56) References Cited

U.S. PATENT DOCUMENTS

| | | | |
|---|---|---|---|
| 7,783,734 B2* | 8/2010 | Giffin | H04B 7/18578 |
| | | | 709/219 |
| 8,665,777 B2* | 3/2014 | Marshack | H04B 7/18521 |
| | | | 370/261 |
| 9,363,712 B2 | 6/2016 | Chuberre et al. | |
| 9,473,578 B2* | 10/2016 | Gopal | H04W 40/36 |
| 9,596,022 B2* | 3/2017 | Scott | H04L 49/1569 |
| 9,673,889 B2* | 6/2017 | Platzer | H04B 7/18513 |
| 10,063,311 B2* | 8/2018 | Gopal | B64G 1/1085 |
| 10,374,692 B1 | 8/2019 | Banerian et al. | |
| 2002/0032799 A1 | 3/2002 | Wiedeman et al. | |
| 2003/0081582 A1* | 5/2003 | Jain | H04B 7/18582 |
| | | | 370/338 |
| 2013/0003651 A1 | 1/2013 | Hobaya et al. | |

FOREIGN PATENT DOCUMENTS

| | | |
|---|---|---|
| EP | 2887564 A1 | 6/2015 |
| WO | WO 2015/009981 A1 | 1/2015 |

OTHER PUBLICATIONS

German Search Report for German Application No. 102015010132.3 dated Mar. 21, 2016.

International Search Report for Application No. PCT/EP2016/066914 dated Oct. 17, 2016.

English Translation of the International Preliminary Report and Written Opinion for Application No. PCT/EP2016/066914 dated Feb. 13, 2018.

* cited by examiner

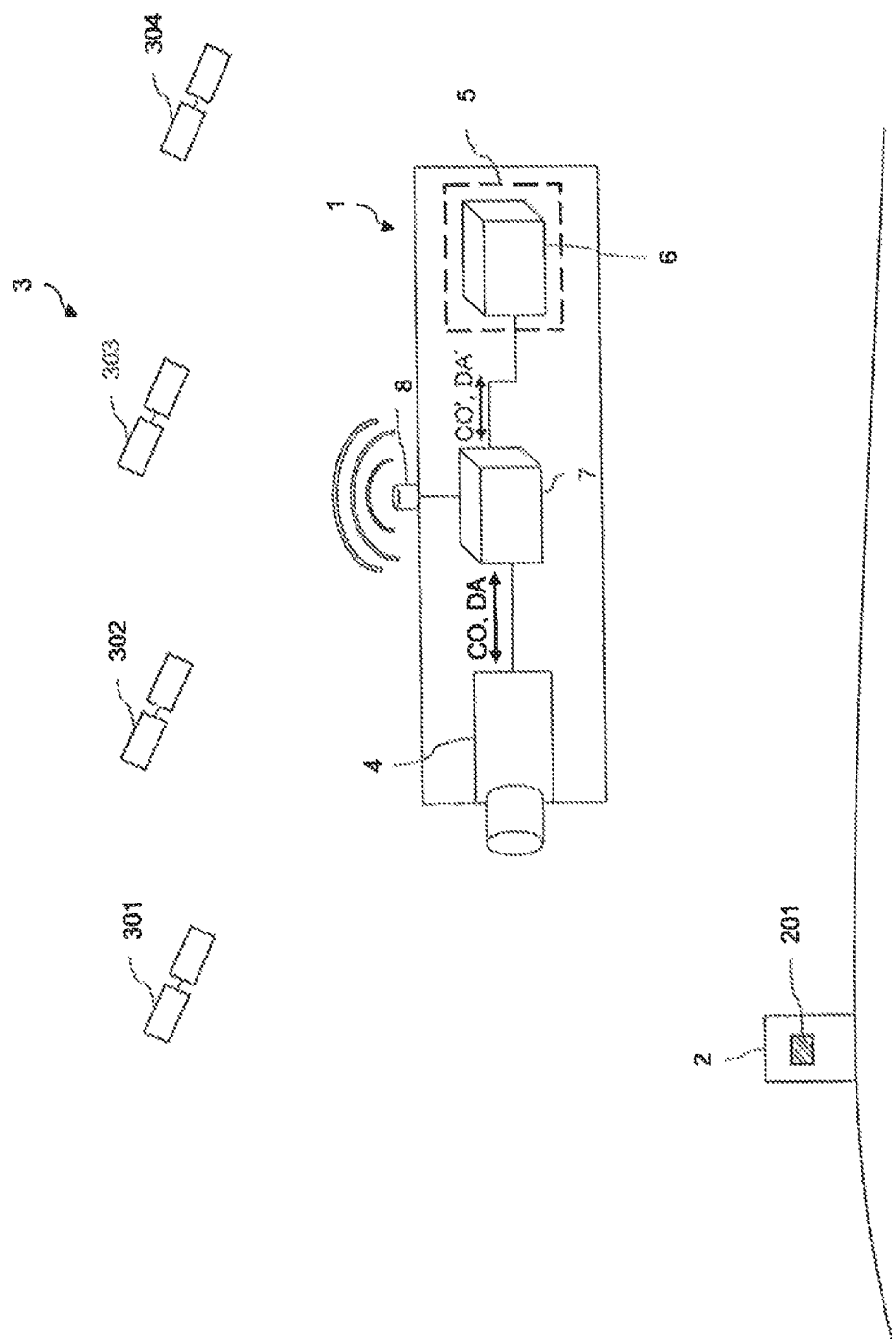

METHOD FOR COMMUNICATION BETWEEN A GROUND TERMINAL ON THE EARTH'S SURFACE AND A SATELLITE

CROSS-REFERENCE TO RELATED APPLICATIONS

This application is a continuation of and claims priority to PCT/EP2016/066914 filed Jul. 15, 2016, which claims the benefit of and priority to and German Patent Application No. 10 2015 010 132.3 filed Aug. 10, 2015, the entire disclosures of which are incorporated by reference herein.

TECHNICAL FIELD

The disclosure herein relates to a method for communication between a ground terminal on the Earth's surface and a satellite, and to a correspondingly equipped satellite and a corresponding radio terminal for such a satellite.

BACKGROUND

Conventionally, satellites communicate with the Earth's surface via (or by or through) stationary ground stations. Data exchange between the satellite and the stationary ground station thereby takes place directly by radio. This has the disadvantage that communication is possible only when there is visual contact between the satellite and the ground station. Data exchange is thus complex and, for the period between ground station contacts (which for conventional Earth observation satellites is typically several orbits and several hours), it is necessary to work with timelines via which times for observation operations of the satellite and for data exchange with the Earth are determined in advance. An interactive operation of the satellite and the payload is possible only for the brief period of time during which the satellite is flying over the ground station (which is typically not more than 8 minutes). Relay satellites are in some cases also used for the pure transfer of satellite reference data. However, satellite control does not take place via such relay satellites, nor do they allow a satellite to be reached permanently.

There are further known from the prior art so-called space-based Internet systems, which permit IP-based communication via satellites with the interposition of a radio transmission. Examples of such space-based Internet systems are the OneWeb and O3B systems, which are at the planning stage. Space-based Internet systems use a large number of satellites with radio terminals located thereon. These terminals allow data to be transferred in fixed frequency bands via IP-based protocols. Via the satellites of the space-based Internet system, Internet requests from one point on the Earth's surface are forwarded to other points, which are able to respond to the requests, again with the interposition of the satellites of the space-based Internet system. Some of the Internet communication thus takes place via the space-based system.

Space-based Internet systems allow communication via Internet in inaccessible regions, such as at sea, in jungle regions or in polar regions. For this purpose, an Internet terminal is set up in such regions on the ground or on a ship, which Internet terminal communicates by radio with the satellites of the space-based Internet system. The space-based Internet system thus represents a permanent, bidirectional and interactive communication bridge between the remote Internet terminal and a main station, such as, for example, a research institute, an agency or a logistics company.

SUMMARY

An object of the disclosure herein is to provide improved communication between a ground terminal on the Earth's surface and a satellite.

Such object is achieved by the method, satellite, and the radio terminal according to the disclosure herein. Further developments of the disclosure herein are defined in the dependent claims.

A method according to the disclosure herein serves for communication between a ground terminal on the Earth's surface and a satellite. The ground terminal is set up for IP-based communication. Likewise, a radio terminal located on the satellite is set up for IP-based communication. Here and in the following, IP-based communication is to be understood as being a data exchange based on the IP protocol (IP=Internet protocol) and optionally also protocols in higher layers above the IP protocol according to the OSI reference model. Such protocols include inter alia TCP (TCP=transmission control protocol), UDP (UDP=user datagram protocol), HTTP(S) (HTTP=hypertext transfer protocol (secure)) and FTP (FTP=file transfer protocol). In order to permit IP-based communication, one (or more) IP address(es) is/are allocated to the radio terminal on the satellite.

Different flying altitudes can be set for the satellite used in the method according to the disclosure herein, and the flying altitude is preferably below the flying altitude of the satellites of the space-based Internet system. Preferred flying altitudes of the satellite are between 350 km and 15,000 km, preferably between 350 km and 1500 km and particularly preferably between 500 km and 1000 km above the Earth's surface. These flying altitude ranges include the flying altitudes of conventional Earth survey satellites. The mentioned flying altitude ranges further include flying altitudes which are suitable for the use of the method with the space-based Internet system OneWeb, the satellites of which are to fly at an altitude of about 1200 km. Likewise, the mentioned ranges include flying altitudes for which the space-based Internet system O3B can be used, in which the flying altitudes of the satellites are at about 8000 km.

The radio terminal (Internet terminal in the satellite) and, as explained later, modules of the satellite connected thereto thus have permanent, bidirectional and interactive Internet contact via the space-based Internet system with the controlling main station. The latter can be, for example, a research institute, an agency or a logistics company.

According to the disclosure herein, the communication proceeds such that the information mentioned hereinbelow is exchanged via one or more IP-based protocols with the interposition of a space-based Internet system: The expression IP-based protocols includes the protocols mentioned above, namely the IP protocol and optionally also protocols at higher layers. There can be used as the space-based Internet system, for example, the OneWeb or O3B system mentioned at the beginning. However, any other space-based Internet systems can also be used in the method according to the disclosure herein. For the radio transmission between the ground terminal, the space-based Internet system and the satellite, the Internet protocol packets can additionally be packaged in error correction protocols such as LTE (long term evolution) or CCSDS (consultative committee for space data systems). This takes place in accordance with the space-based Internet system technique used and is not important for the disclosure herein.

According to the disclosure herein, control commands for one or more modules of the satellite are transmitted from the ground terminal to the radio terminal, wherein the radio terminal receives the control commands by radio from the space-based Internet system and forwards them to the module or modules coupled in the satellite with the radio terminal. For that purpose, each controlled module preferably receives its own IP address in the satellite. Alternatively or in addition, module data coming from one or more modules of the satellite are transmitted from the radio terminal to the ground terminal. The radio terminal thereby transmits the module data to the space-based Internet system by radio.

The method according to the disclosure herein has the advantage that, via IP-based data transfer with the interposition of a space-based Internet system, very reliable data exchange between the ground terminal and the satellite is ensured independently of the orbital position of the satellite. In particular, visual contact between the ground terminal and the satellite is not required for data exchange, as is the case in the prior art. Full bidirectionality (that is to say control and result feedback) is also ensured, in contrast to pure reference data transfer to the ground via relay satellites, as are in some cases also used today. Communication including result feedback can thus take place virtually without a time delay, which significantly facilitates the retrieval of module data from the satellite or the transmission of control commands to the satellite.

In an embodiment, control commands for at least one payload of the satellite are transmitted from the ground terminal to the radio terminal. Payload is a standard term in the field of satellite technology. Payload is to be understood as being the instruments of the satellite according to its intended use. A payload represents a module of the satellite. Alternatively or in addition, module data coming from at least one payload of the satellite can also be transmitted from the ground terminal to the radio terminal.

In an embodiment, the at least one payload comprises a device for acquiring signals from the Earth's surface, in particular a radar system and/or a camera system. However, any other payloads for a satellite are also conceivable.

In a further variant of the method according to the disclosure herein, control commands for the platform of the satellite are transmitted from the ground terminal to the radio terminal in the satellite. Preferably, the radio terminal forwards the control commands for the platform to a central computer for platform control, which then processes the control commands. In a further variant, the radio terminal receives the module data coming from the platform computer of the satellite from the central computer and then transmits them by radio. Analogously to payload, platform is also a standard term in the field of satellite technology. The platform is a module and substantially represents the supply unit of the satellite which allows the payload or payloads to operate.

In an embodiment, the module data which are transmitted within the scope of the method according to the disclosure herein relate to operating data and/or measured data of the module or modules of the satellite. Operating data are values relating to the operation of the corresponding module itself. Measured data, on the other hand, are external values which are not directly connected to the operation of the module. For example, if the module is a payload in the form of a camera system, the measured data are the images acquired by the camera system.

In a further preferred embodiment, a user interface is provided in the ground terminal, via which interface a user can effect the transmission of the control commands and/or the transmission of the module data. In this manner, interactive communication between a user in the ground terminal and the satellite is made possible. The user interface preferably comprises a web browser via which the radio terminal of the satellite is addressable by its IP address.

In a further variant of the disclosure herein, in the event of an interruption in communication between the radio terminal and the ground terminal, control commands for transmission are buffered in the ground terminal. Alternatively or in addition, module data for transmission are buffered in the satellite. The buffered control commands or module data are then transmitted when the interruption has ended. With this variant, interruptions in the radio communication between the radio terminal and the space-based Internet system can be bridged.

In an embodiment, in order to increase the security of the method, the communication between the ground terminal and the satellite is encrypted, for example using conventional Internet encryption techniques, such as VPN (virtual private network).

In addition to the method described above, the disclosure herein relates to a satellite for use in this method or in one or more preferred variants of the method. The satellite comprises a radio terminal which is set up for IP-based communication and is configured, via one or more IP-based protocols, to receive by radio from a space-based Internet system control commands for one or more modules of the satellite coming from a ground terminal set up for IP-based communication and to forward those commands to the module or modules. Alternatively or in addition, the radio terminal is configured, via one or more IP-based protocols, to transmit by radio to the space-based Internet system module data coming from one or more modules of the satellite and addressed to the ground terminal.

In addition to the above-described method and the satellite, the disclosure herein relates to the special radio terminal for the satellite. The radio terminal is set up for IP-based communication and is configured, via one or more IP-based protocols—optionally additionally packaged in radio protocols such as CCSDS or LTE—, to receive by radio from a space-based Internet system control commands for one or more modules of the satellite coming from a ground terminal set up for IP-based communication and to forward those commands to the module or modules. Alternatively or in addition, the radio terminal is configured, via one or more IP-based protocols, to send by radio to the space-based Internet system module data coming from one or more modules of the satellite and addressed to the ground terminal. In order to permit IP-based communication, the radio terminal has at least one IP address, preferably an IP address for each module in the satellite. In particular, the radio module can distribute data from the ground station to the modules according to their IP addresses and receive data from the modules according to their IP addresses and transfer them back to the ground station.

The communication between the radio terminal in the satellite and the payload or platform module assigned to the IP address does not necessarily have to be transferred electrically/logically via Ethernet, as is known in the Internet sector, but can also take place via serial interfaces such as, for example, RS422, LVDS, SpaceWire or via data buses such as MIL1553 or CAN. Realisation of this transfer technique takes place subject to the satellite developer and is not important for the disclosure herein.

BRIEF DESCRIPTION OF THE DRAWINGS

An embodiment of the disclosure herein is described in detail hereinbelow with reference to the accompanying FIG. 1. This FIGURE shows the components used in a variant of the method according to the disclosure herein.

DETAILED DESCRIPTION

The embodiment of the disclosure herein described herein permits reliable, interactive and bidirectional communication between a satellite 1 and a ground terminal 2 located on the Earth's surface. The communication is IP-based—optionally additionally packaged in radio protocols on the radio segments—and takes place with the interposition of a space-based Internet system in the communication path between the satellite 1 and the ground station 2. As already mentioned at the beginning, IP-based communication is to be understood as being communication via the IP protocol and optionally via protocols at higher layers according to the OSI reference model. In other words, IP-based communication means communication with one or more protocols from the Internet protocol family.

The space-based Internet system is indicated by reference numeral 3. The system comprises a plurality of satellites, wherein there are shown by way of example in FIG. 1 four satellites 301, 302, 303 and 304. There can be used as the space-based Internet system any system known from the prior art, such as, for example, OneWeb or O3B. The flying altitude of the satellite 1 is lower than that of the satellites of the Internet system 3.

In order to permit IP-based communication, a radio terminal 7 provided on the satellite 1 communicates by radio by an antenna 8 with satellites from the space-based Internet system, which in turn are connected with the Internet infrastructure on the Earth by a radio link to corresponding ground stations. The mode of functioning of the radio terminal 7 will be described in greater detail hereinbelow. The satellite 1 further comprises a platform 5 which is shown merely schematically by a dashed rectangle. The platform 5 contains a central computer 6 which is conventionally referred to as an on-board computer and serves to control the satellite platform. The satellite 1 additionally contains a payload 4, which in the exemplary embodiment described here is a camera system for recording images of the Earth's surface. Both the platform 5 or the computer 6 and the payload 4 have a communication link to the radio terminal 7.

The radio terminal 7 has one or more own IP address(es) and is set up for IP-based communication. The terminal receives by radio by the antenna 8 data from the Internet system 3, which come from the ground terminal 2. The ground terminal 2 is likewise set up for IP-based communication and to that end also has an IP address. The radio terminal 7 can further transmit data which are addressed to the ground terminal 2 by radio to the space-based Internet system 3, which then forwards those data to the ground terminal 2. The communication by radio uses a radio protocol and frequency band given by the space-based Internet system.

Different types of data are transmitted via the IP-based communication between the ground terminal 2 and the radio terminal 7, which is preferably encrypted by methods known per se. On the one hand, control commands CO for the payload 4 are received, which the terminal 7 forwards to the payload. Analogously, telemetry data (i.e. operating data of the payload) and measured data acquired by the payload are transmitted from the payload 4 to the terminal 7, which transmits those data based on protocols of the Internet protocol family by the antenna 8. The target address of these data is the ground terminal 2. These data then reach the ground terminal via the space-based Internet system 3. The mentioned telemetry data or measured data of the payload are designated data DA in FIG. 1.

Control commands CO' which are directed to the platform 5 are also received by the radio terminal 7 by IP-based communication. These control commands again come from the ground station 2 and are forwarded from the terminal 7 to the computer 6, which then performs the corresponding control task according to the control commands. Telemetry data DA' relating to the platform (i.e. operating data of the platform) are further transmitted from the platform 5, or the computer 6, to the terminal 7, which transmits those data addressing the ground terminal 2 via the antenna 8. The data then reach the ground terminal 2 with the interposition of the space-based Internet system 3. The data exchange between the ground terminal 2 and the satellite 1 takes place interactively based on operating actions of a user in the ground terminal 2. A user interface 201 is provided for this purpose in the ground terminal. This user interface is preferably a web browser, via which a communication with the terminal 7 can be established via its IP address. For interactive tasks, such as interactive control of cameras or of the satellite, corresponding operating elements such as joysticks and the like can optionally also be used in the ground station.

If the flight path of the satellite 1 is so chosen that it is permanently located in radio cones of corresponding satellites of the space-based Internet system, uninterrupted communication between the satellite 1 and the ground terminal 2 is ensured. Control commands or other data can thus be exchanged interactively with the satellite via the user interface 201 at any desired orbital position of the satellite 1. In particular, telemetry data of the satellite platform or payload telemetry data and payload measuring results can be retrieved at any time. In the embodiment of FIG. 1, images from the camera system 4 can thus be retrieved at any time.

The ground terminal 2 can thus perform the function of a conventional ground station. However, because of the IP-based communication with the interposition of the space-based Internet system, it is no longer necessary for the ground terminal 2 to have visual contact with the satellite 1, as is the case in conventional systems. Consequently, it is no longer necessary to work with timelines via which it is determined when particular information is to be acquired from the satellite and at what time information is to be exchanged between the ground station and the satellite.

The flying altitude of the satellite 1 may also be so set that interruption-free Internet contact of the terminal 7 with the space-based Internet system 3 cannot be guaranteed. This case occurs when the satellite 1 or the terminal 7 is temporarily not in a radio cone of a corresponding satellite of the space-based Internet system. In a preferred variant, therefore, corresponding buffers are provided both in the ground terminal 2 and in the satellite 1, which buffers allow data to be stored temporarily so that no information is lost in the event of a break in contact between the terminal 7 and the space-based Internet system 3. Control commands CO and CO' which are to be transmitted to the satellite 1 by the ground terminal 2 are thereby stored temporarily in the buffer of the ground terminal until interruption-free contact is established again. Analogously, data DA or DA' to be transmitted to the ground terminal are stored temporarily in the buffer of the satellite until interruption-free Internet contact is ensured again. The buffer of the satellite is preferably integrated in the terminal 7.

The embodiments of the disclosure herein described hereinbefore have a number of advantages. In particular, reliable, interactive and bidirectional communication between a ground terminal and a satellite is ensured by the use of a space-based Internet system. To this end, a suitable radio terminal for IP-based communication is integrated into the satellite. In this manner, it is possible for a satellite to be controlled permanently by the ground terminal at any orbital position, or operating data and measured data from the satellite can be received in the ground terminal at any time. Based on the method according to the disclosure herein, satellites and their payloads are thus controllable via the Internet. In contrast to conventional communication between a stationary ground station and a satellite, satellite control no longer needs to be based on the above-mentioned timelines. Moreover, communication between the ground terminal and the satellite can take place interactively by a user interface in the ground station.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 satellite
2 ground station
201 user interface of the ground station
3 space-based Internet system
301, 302, 303, 304 satellites of the space-based Internet system
4 payload of the satellite
5 platform of the satellite
6 central computer
7 radio terminal
8 antenna
CO control commands for the payload
CO' control commands for the platform
DA data from the payload
DA' data from the platform

The invention claimed is:

1. A method for communication between a ground terminal on Earth's surface and a satellite, wherein the ground terminal and a radio terminal of the satellite are configured for Internet Protocol-based (IP-based) communication, the method comprising:
via one or more IP-based protocols, with interposition of a space-based Internet system:
transmitting control commands for one or more modules of the satellite from the ground terminal to the radio terminal, which receives the control commands by radio from the space-based Internet system and forwards the control commands to the one or more modules; and
transmitting module data coming from one or more modules of the satellite from the radio terminal to the ground terminal, wherein the radio terminal transmits the module data by radio to the space-based Internet system;
wherein a flying altitude of the satellite is lower than that of the space-based Internet system;
wherein the satellite comprises a payload comprising a camera system configured for recording images of the Earth's surface;
wherein in the ground terminal a user interface is provided by which a user can affect transmission of the control commands and transmission of the module data; and
wherein the user interface comprises a web browser by which the radio terminal of the satellite is addressable.

2. The method according to claim 1, wherein control commands for at least one payload of the satellite are transmitted from the ground terminal to the radio terminal, and wherein module data coming from at least one payload of the satellite are transmitted from the radio terminal to the ground terminal.

3. The method according to claim 1, wherein control commands for a platform of the satellite are transmitted from the ground terminal to the radio terminal, and wherein module data coming from the platform of the satellite are transmitted from the radio terminal to the ground terminal.

4. The method according to claim 3, wherein the radio terminal forwards the control commands for the platform to a central computer for platform control, and wherein the radio terminal receives the module data coming from the platform of the satellite from the central computer for platform control and then transmits them by radio.

5. The method according to claim 1, wherein the module data are operating data and measured data of the module or modules of the satellite.

6. The method according to claim 1, wherein, in an event of an interruption in communication between the radio terminal and the ground terminal, control commands for transmission are buffered in the ground terminal and module data for transmission are buffered in the satellite, wherein the buffered control commands and module data are transmitted when the interruption has ended.

7. The method according to claim 1, wherein the communication between the ground terminal and the satellite is encrypted.

8. The method according to claim 1, wherein the satellite has a flying altitude between 350 km and 15,000 km, between 350 km and 1500 km, or between 500 km and 1000 km above the Earth's surface.

9. A radio terminal for a satellite for use in a method according to claim 1, wherein the radio terminal is configured for IP-based communication and is configured, by one or more IP-based protocols:
   to receive by radio from a space-based Internet system control commands for one or more modules of the satellite coming from a ground terminal and to forward the commands to the one or more modules; and
   to transmit by radio to the space-based Internet system module data coming from one or more modules of the satellite and addressed to the ground terminal.

10. A satellite for communication between a ground terminal on Earth's surface and a satellite, wherein the ground terminal and a radio terminal of the satellite are configured for Internet Protocol-based (IP-based) communication, the communication configured for:
   via one or more IP-based protocols, with interposition of a space-based Internet system:
      transmitting control commands for one or more modules of the satellite from the ground terminal to the radio terminal, which receives the control commands by radio from the space-based Internet system and forwards the control commands to the one or more modules; and
      transmitting module data coming from one or more modules of the satellite from the radio terminal to the ground terminal, wherein the radio terminal transmits the module data by radio to the space-based Internet system;
   wherein the radio terminal of the satellite is configured for IP-based communication and is configured, via one or more IP-based protocols:
      to receive by radio from a space-based Internet system control commands for one or more modules of the satellite coming from a ground terminal and to forward those commands to the one or more module; and
      to transmit by radio to the space-based Internet system module data coming from one or more modules of the satellite and addressed to the ground terminal;
   wherein a flying altitude of the satellite is lower than that of the space-based Internet system;
   wherein the satellite comprises a payload comprising a camera system configured for recording images of the Earth's surface;
   wherein the ground terminal comprises a user interface by which a user can affect transmission of the control commands and transmission of the module data; and
   wherein the user interface comprises a web browser by which the radio terminal of the satellite is addressable.

* * * * *